Sept. 24, 1968

D. E. BANKS 3,402,626

CONTROLS FOR CUTTING PRESSES

Filed Oct. 20, 1966

Inventor
David E. Banks
By his Attorney
George C. Fuller

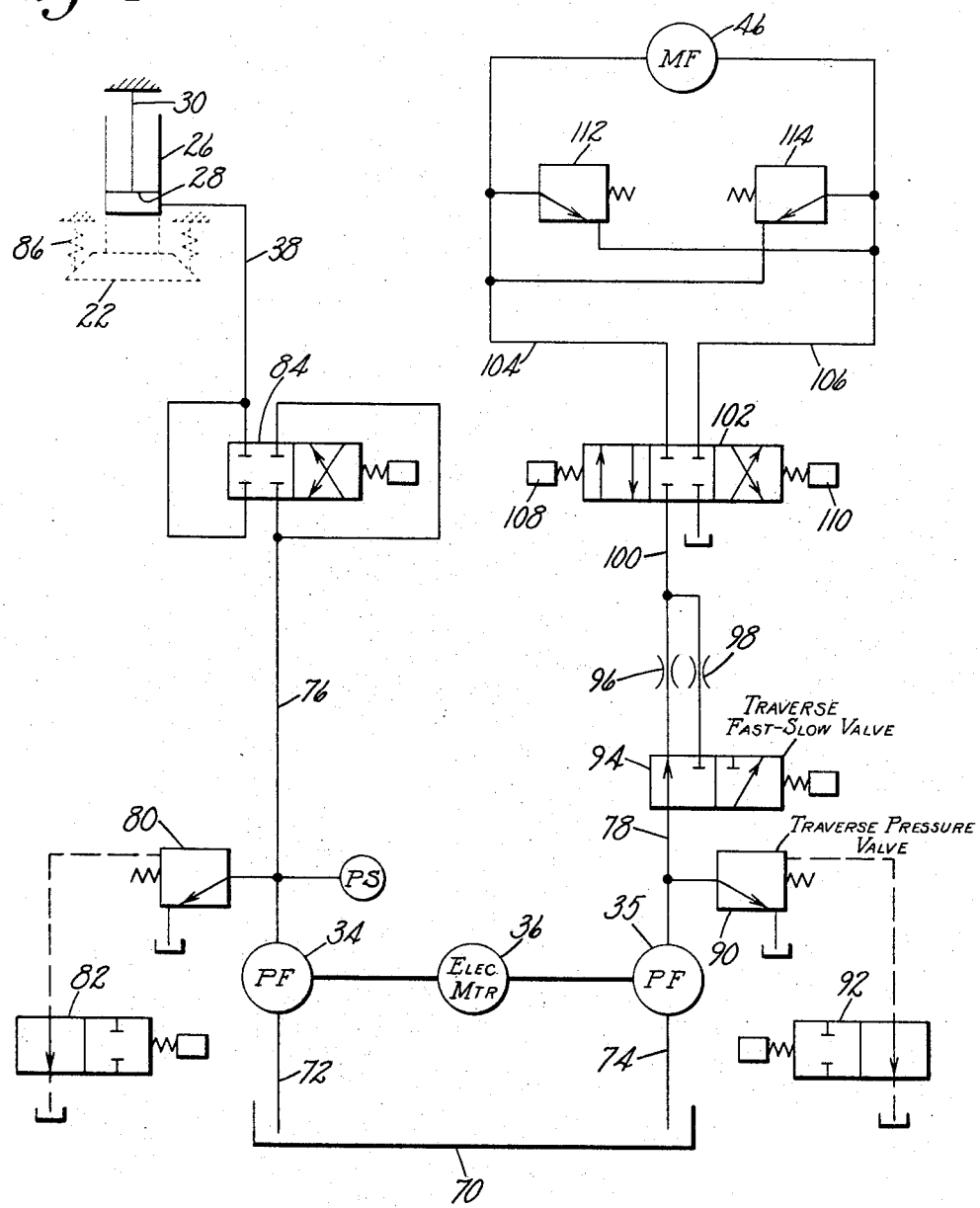

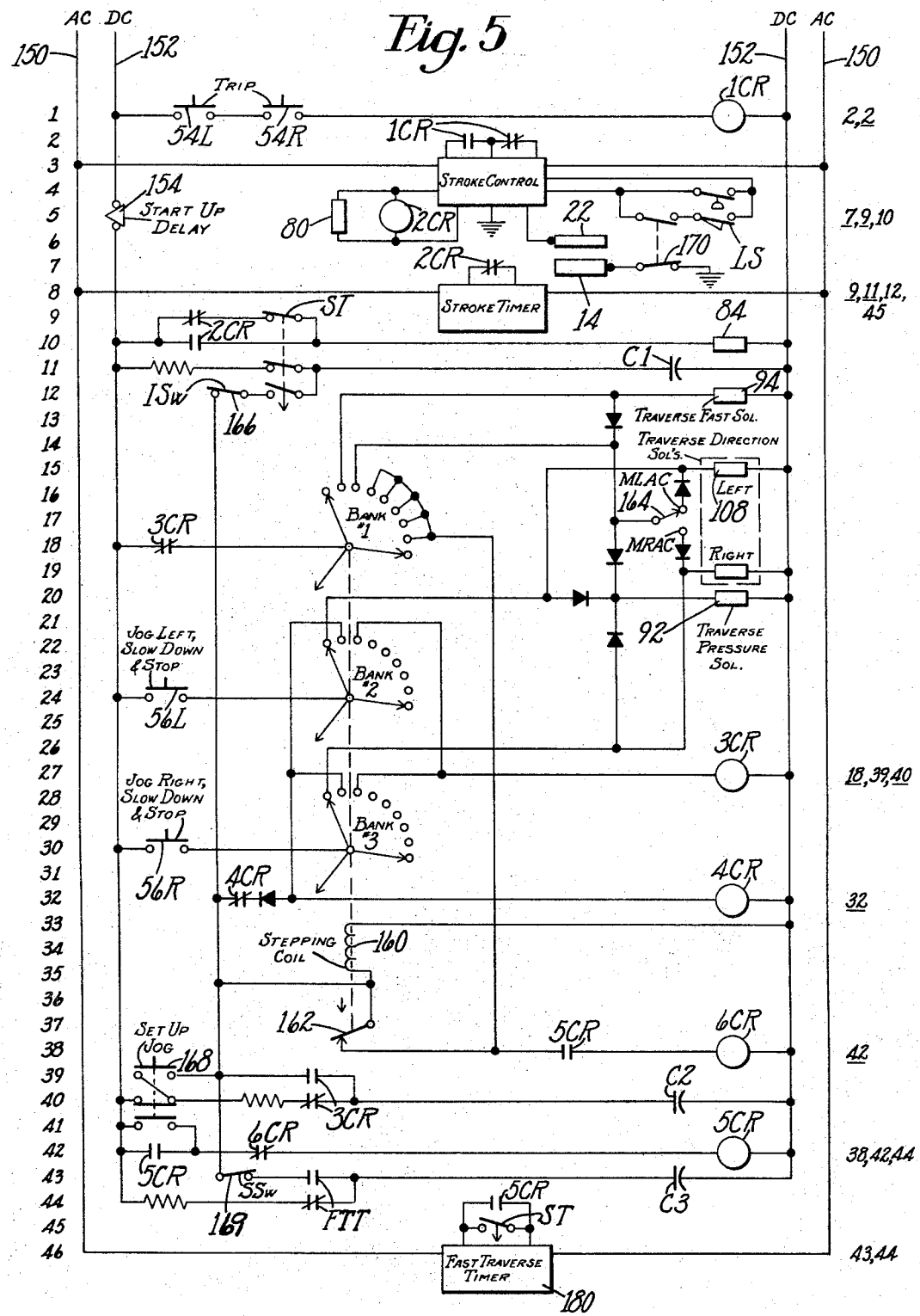

United States Patent Office 3,402,626
Patented Sept. 24, 1968

3,402,626
CONTROLS FOR CUTTING PRESSES
David E. Banks, Hamilton, Mass., assignor to United Shoe Machinery Corporation, Flemington, N.J., a corporation of New Jersey
Filed Oct. 20, 1966, Ser. No. 588,062
6 Claims. (Cl. 83—57)

This invention relates to improvements in cutting apparatus and in particular relates to improvements in controls for cutting presses of the type commonly referred to as traveling head cutting presses which are characterized by having a relatively wide cutting bed and a presser head movable in traverse across the bed for cutting in various widthwise locations thereon.

Automatic controls of various degrees of sophistication have heretofore been provided for traveling head cutting presses. Controls providing a fully automatic program of presser head movements are advantageously used for cutting parts from webs of sheet material of uniform width and character, such controls providing, for a simple example, traverse movement of the presser head in uniform increments between successive cutting strokes of a presser member carrying a cutting die, all without intervention of the operator until the entire width of the web has been traversed.

There are, however, in die cutting operation certain situations in which it is desirable for an operator of a traveling head cutting press to be able to employ discretion in the selection of sequential cutting locations and in which situations, for example where a heavy die is being used, it is also desirable to relieve the operator of the task of picking up and relocating a die.

It is an object of the present invention to provide, in cutting presses of the foregoing type, control means which meet the needs of the hereinabove described situation and other situations requiring operator discretion while maintaining a high production rate in the over-all operation of the press.

Another object of the present invention is to provide control means for presses of the foregoing type which will afford for an operator thereof freedom of movement to maintain the work and cutting die under close observation and attendance as the traveling head moves along the cutting bed.

To this end and in accordance with a feature of the present invention there is provided, in a cutting press of the foregoing type, control means for regulating the movements of a traveling head presser member adapted to carry a cutting die. The control means includes program means and a manually operated controller movable with the operator as he tends the work. The control means is operable in response to actuation of signal means of the controller for controlling the press. The control capability includes initiating a sequence of movements under control of the program means for causing the presser member to be moved toward and away from the cutting bed in a cutting stroke thereafter to be moved in traverse for relocation of the head at the next cutting position. Said control means is responsive to a subsequent predetermined signal from the controller for causing termination of the traverse movement. As illustrated, said controller comprises a pair of portable signalling units connected by extension cords to the control means although radiant energy signal transmission may be employed if desired.

In accordance with a further feature of the invention the program means includes means operative during the traverse movement of the presser head to provide a fast to slow change of the speed of said movement. The speed change may be effected selectively either manually by the controller or automatically by timer of the program means.

Other features and advantages of the invention will best be understood from the following description taken with the accompanying drawings in which:

FIG. 4 is a diagram of hydraulic circuits of the apparatus shown in FIG. 1, and

FIG. 5 is a diagram of electric circuits of the apparatus shown in FIG. 1.

Figure 1:
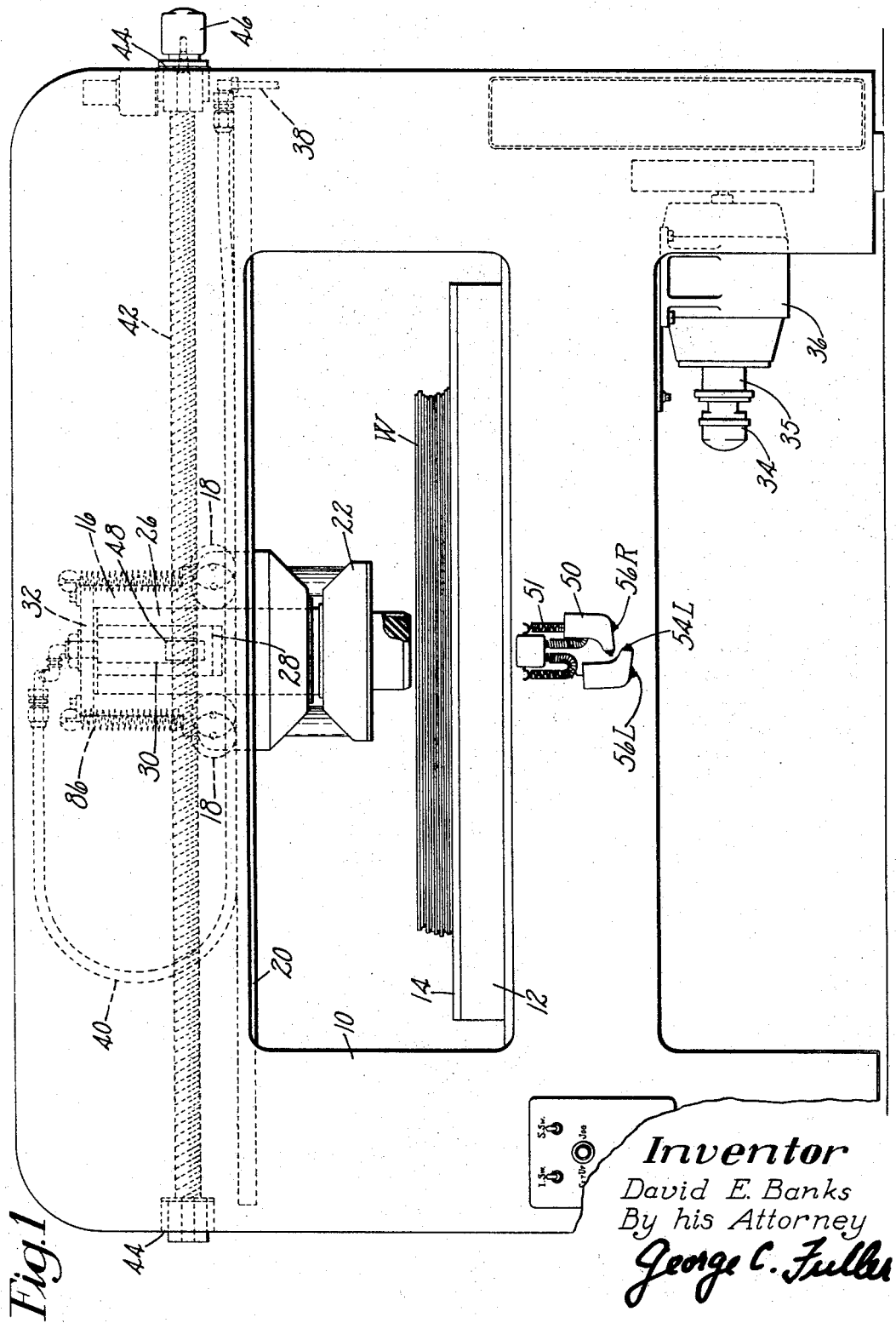
FIG. 1 is a front elevation of an illustrative traveling head cutting press embodying the present invention.

Referring to FIG. 1, there is illustrated therein a cutting press of the traveling head type comprising a frame 10 supporting a cutting bed 12 the upper surface portion 14 of which suitably comprises a conductive rubber pad for purposes of stroke termination through die-pad electrical conduction. On the cutting bed is shown work piece W comprising a plurality of plies of sheet material.

As in the usual construction of such presses, a presser head 16 is mounted for movement of traverse widthwise of the cutting bed for which purpose the head is provided with rollers 18 riding on rail means 20 affixed to the frame 10.

The presser head 16 includes a presser member 22 adapted to have a die 24 affixed thereto for movement with the presser member. The latter member is mounted on a cylinder 26 slidable within the presser head 16 for vertical movement. Means for moving the presser member toward and away from the cutting bed 12 comprises a hydraulic motor having a piston 28 slidable within the cylinder 26 and mounted on a hollow piston rod 30 connected to a cylinder cap 32 bolted to the presser head 16. Means for supplying pressure fluid through the piston rod 30 to the lower end of the piston includes a pump 34 driven by an electric motor 36 and means for connecting the pump to the piston rod adjacent the upper end thereof, which connecting means includes a rigid conduit 38 and a flexible hose 40 together with associated couplings and fittings.

Means for providing movement of traverse of the presser head 16 comprises a lead screw 42 journaled in bearings 44 at either side of the frame 10 and connected to a rotary hydraulic motor 46 operable to rotate the lead screw selectively in either direction. The lead screw 42 engages nut means 48 mounted on the presser head 16 so that rotation of the screw 42 imparts motion of traverse to the presser head.

Also shown in FIG. 1 is a controller comprising a pair of portable signaling units 50 connected by self-coiling extension cords 51 in control means for regulating the vertical and traverse movements of the presser member 22 through selective operation of their respective motor means.

Figure 2:
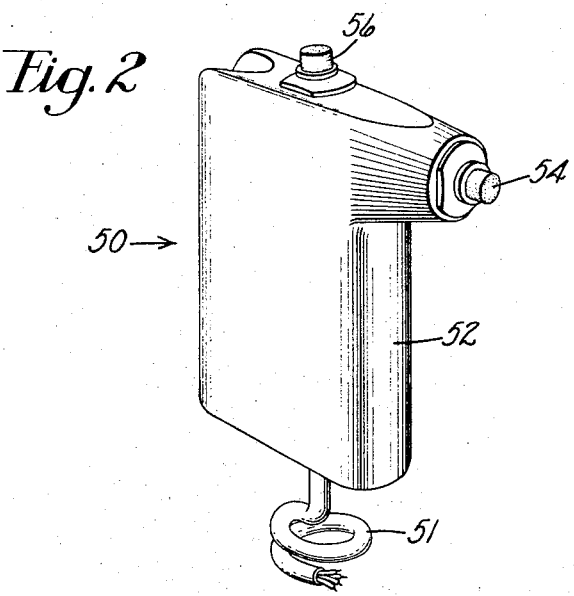
FIG. 2 is a perspective view on an enlarged scale of a controller shown in FIG. 1.
Figure 3:
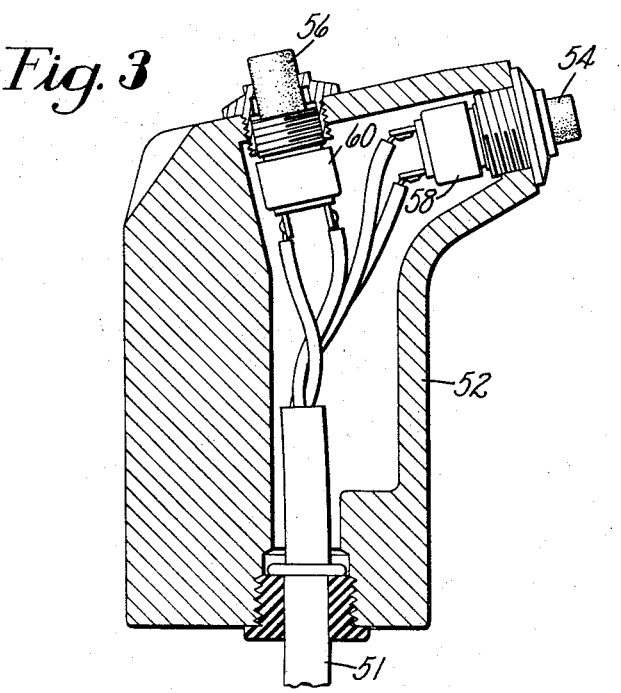
FIG. 3 is a transverse sectional view of the controller shown in FIG. 2.

Referring to FIGS. 2 and 3, each signaling unit 50 comprises a case 52 suitably formed to be grippingly received by the hand of an operator with his forefinger on an outer trip button 54 and with his thumb on a top jog or slow button 56. The buttons 54 and 56 constitute parts of switches 58 and 60, respectively, which switches are signal means communicating with said control means and mounted in the case 52 for actuation by depressing the buttons for closure of their contacts to transmit an electric signal via the extension cords 51 to a fixed portion of the control means. The location of the buttons may be reversed or otherwise changed if desired.

Referring to FIG. 4 of the drawings, the hydraulic supply and control means of the press comprise a sump 70 from which pressure fluid is drawn through inlet tubes 72 and 74 to pumps 34 and 35 respectively and supplied thereby to outlet conduits 76 and 78. Pressure in the conduit 76 is controlled by a piloted stroked pressure valve 80 having a solenoid operated pilot valve 82. When the solenoid of this valve is not energized, pressure fluid is returned from the conduit 76 to the sump 70. The conduit 76 communicates with the actuating mechanism of a pressure switch denoted by the symbol PS which serves to shut off the electric motor should excessive pressure develop. The conduit 76 also communicates with a solenoid operated stroke control valve 84 which, when its solenoid is de-energized, cuts off communication between the outlet conduit 76 and the conduit 38 supplying pressure fluid to the cylinder 26, thereby locking up the cylinder hydraulically against vertical movement. If the valve 84 is energized, pressure fluid in the cylinder 26 below the piston 28 will be exhausted, as a result of the action of return springs 86, through the valve 80 thus permitting the presser member 22 to move upwardly. If both valves 80 and 84 have their associated solenoids energized, fluid will be admitted to the cylinder 26 under pressure to cause the presser member 22 to be moved downwardly.

Pressure fluid for effecting traverse movement of the presser member is provided from the conduit 78 in which the pressure is controlled by a piloted traverse pressure valve 90 having operatively associated therewith a solenoid operated pilot valve 92. The conduit 78 communicates through a solenoid operated traverse fast-slow valve 94 with one or the other of two restrictions 96, 98 of different values leading to an intermediate conduit 100. The conduit 100 communicates through a solenoid operated traverse left-right valve 102 with conduits 104 and 106 connected to the motor 46. When there is pressure in the conduit 100, and a left solenoid 108 of the valve 102 is energized, pressure fluid is admitted to the conduit 104 and passes to the motor 46 returning therefrom to the sump via the conduit 106 causing the motor to drive the screw 42 in a direction to move the presser member 22 to the left as seen in FIG. 1. If a right solenoid 110 of the valve 104 is energized the pressure fluid flows through the motor in the opposite direction for moving the presser member 22 toward the right. Relief valves 112, 114 are provided to limit the torque on the screw 42 in either direction. The speed of the motor 46 is controlled by the traverse fast-slow valve 94, which, in the illustrated position with its solenoid de-energized, routes the pressure fluid through the restriction 96 while when the solenoid is energized, routes the fluid through the restriction 98 which permits a greater flow than the restriction 96.

FIG. 5 shows a diagram of the electrical control means, including program means and controller, for the illustrative press. Means comprising A.C. leads 150 and D.C. leads 152 are provided for supplying electrical energy to the control circuits. In line 8 of the diagram is a stroke timer which controls the contacts indicated by numerals in the right hand column designating the lines in which the controlled contacts are to be found. Underlined numerals refer to normally closed contacts. With power applied on the leads 150, the timer operates to transfer its controlled contacts a predetermined time after closure of the timer control contacts (line 7). Accordingly, a start-up delay 154 is provided in the D.C. line to prevent the application of power to any of the control valve solenoids before the stroke timer has timed out.

Programming means of the control means includes a stepping switch having a stepping coil 160 and three banks of contacts. With the stepping switch in position 1, depressing the top jog or slow button 56L of the left portable signaling unit 50 will apply power through bank 2 to the left solenoid 108 of the traverse left-right valve 102. This will cause the pressure member 22 to move to the left. With the stepping switch in position 2, depression of the button 56L will simultaneously energize 4CR (line 32) and the stepping switch coil. However, the pull-in characteristics of these coils will be such that the stepping switch will pull in just prior to operation of 4CR. As soon as 4CR pulls in, it opens the stepping switch power supply thus dropping it out and indexing it one position. Accordingly, the armature of bank 1 will be moved from the second contact where it energizes the solenoid of the traverse fast-slow valve 94 to the third contact to effect a change in the traverse speed from fast to slow. With the stepping switch in the position 3, pressing the button 56L will energize relay 3CR, opening line 18 for de-energizing the traverse pressure solenoid and from the left solenoid 108 of the traverse left-right valve thus stopping the traverse movement of the presser member 22. Closure of the 3CR (line 39) connects the charged capacitor C2 to the stepping switch coil 160 causing it to index one position. The relay 3CR is then de-energized and the armatures of the stepping switch are advanced four steps by operation of the stepping coils stepping contact 162 to return to the illustrative position. Depressing the button 56R operates in the same way except that the move-right solenoid 110 of the valve 102 is energized instead of the left solenoid 108. A switch 164 designated "MLAC/MRAC" (move left after cut/move right after cut) is operative to select the direction in which the traverse motion is to take place after the cutting stroke. An isolation switch 166 is provided to allow operation of the power cutting stroke system for set-up without the automatic initiation of traverse motion on completion of a stroke. A set-up jog switch 168 is provided to enable the operator to set up the distance of fast traverse prior to automatic change to the slow speed. A manual or automatic selector switch 169 is provided for programming the speed change between a manual speed change mode and an automatic speed change mode.

In operation in the manual speed change mode, the die will be attached to the underside of the presser member 22. The isolating switch 166 will be opened. The operator will set the delay control on the stroke timer approximately. To test the setting the operator will depress the trip buttons 54L and 54R causing one cycle of the cutting stroke and adjust the setting of the stroke timer as necessary. The operator will then set the MLAC/MRAC switch 164 to the direction that he wants the head to travel after making the cut. The operator will close the power stroke isolating switch and open the "manual or auto" selector switch 169. Using the appropriate button 56, the head will then be moved in traverse until the die is in position for the first production cut. The operator will then simultaneously depress the trip buttons 54. This will energize 1CR (line 1) energizing the stroke control circuit of line 3 which in turn energizes 2CR and the stroke pressure valve 80. The pressure member 22 and die will move down and make the cut until, as selected by the positioning of a switch 170 (line 6) die to pad contact is made or a stroke limit control switch LS is actuated after which the presser member moves up because of the dropping out of relay 2CR and the stroke pressure valve until the die is clear of the material. The head will then automatically start to move to the side at the fast speed as the stepping switch is advanced one position by operation of the stroke timer in connecting a charged capacitor C1 to the stepping coil. At the correct moment as judged by the operator, the jog right or left button is pressed energizing the stepping coil and causing relay 4CR to be pulled in, causing the switch to index one contact and removing power from the fast solenoid 94. At another correct moment, as judged by the operator, the jog right or left button is again pressed, relay 3CR is energized, the presser member traverse is stopped, the stepping switch is returned to its illustrative position and the head should be in the correct position for the next cut; however, if the operator has erred the situation can be remedied by using the appropriate jog button 56 to effect traverse movement before tripping the next cutting stroke.

In operation in a mode in which the speed change is made automatically, the preliminary set-up steps are similar to the manual speed change mode except that the "manual or auto" speed change selector switch 169 is closed and the operator will have set on a fast traverse timer 180 (line 46) an estimated value of delay for the distance of high speed travel and checked this setting by pressing and releasing the "set-up jog" switch 168 to close the contacts of line 41.

This will index the stepping switch one contact and initiate the "fast traverse" timer. After the preset interval the latter will time out and the traverse motion will change to a slow speed. The operator will then press the button of the switch 168 a second time in order to stop the traverse motion, and adjust the fast traverse timer if necessary until the distance traversed at high speed by the presser member 22 is satisfactory. Thereafter the operator will close the power stroke isolating switch 166, jog the presser member into position for the first cut, and depress the trip buttons. The die will then be moved down and make the cut and then move up until the die is clear of the material. The head will then automatically start to move to the side at high speed until under the control of the fast traverse timer at the completion of its delay period the head motion is changed to the slow speed. When the operator judges that the head is in the correct position for the second cut he will depress and release a jog button thus causing the traverse motion to stop. The head should now be in correct position for the second cut but if not may be jogged to the correct position.

Having thus described my invention, what I claim as new and desire to secure by Letters Patent of the United States is:

1. In a cutting press of the traveling head type having a relatively wide cutting bed and a presser member movable in traverse across the bed and toward and away from said bed in cutting strokes for pressing a die carried thereby through a work piece in various locations widthwise of said bed and power means for moving said presser member in traverse and toward and away from said bed, in combination therewith, control means for regulating the movements of said presser member, said control means including program means and a controller, said controller having manually actuatable signal means communicating with said control means and being movable independent of said presser member along said cutting bed for operation by an operator in the normal course of attending the cutting operation at various locations on said bed, said control means being operable in response to actuation of said signal means to effect and interrupt movement of traverse of said presser member selectively in one or the other direction, to initiate a sequence of movements under the control of said program means, said sequence comprising movement of said presser member toward and away from said bed in a cutting stroke followed by movement of traverse of said presser member in a preselected direction, and to interrupt said movement of traverse.

2. Apparatus as in claim 1 in which said program means has means operative during said traverse movement of the presser member to change the speed of said traverse movement between a predetermined relatively fast and a relatively slow speed.

3. Apparatus as in claim 2 in which said program means has a timer operative to effect said change of speed after a predetermined interval.

4. Apparatus as in claim 2 in which said program means has means operative to cause said control means to effect said change of speed in response to a predetermined signal from said controller.

5. Apparatus as in claim 1 in which said controller comprises at least one portable signaling unit.

6. Apparatus as in claim 1 in which said controller comprises a pair of portable manually operated signaling units adapted to be carried one in each hand of the operator, the signal means of said units comprising switches arranged for actuation by the operator and connected in said control means for initiating a cutting stroke only by simultaneous actuation of a switch in both portable signaling units.

References Cited

UNITED STATES PATENTS

| 1,403,541 | 1/1922 | Eaton | 83—541 X |
| 3,190,166 | 6/1965 | Haas | 83—534 |
| 3,204,506 | 9/1965 | Reinhold | 83—534 |

ANDREW R. JUHASZ, *Primary Examiner.*